US012666214B2

(12) United States Patent
Nagoya

(10) Patent No.: US 12,666,214 B2
(45) Date of Patent: Jun. 23, 2026

(54) SOUND OUTPUT DEVICE, SOUND OUTPUT METHOD, AND STORAGE MEDIUM

(71) Applicant: CASIO COMPUTER CO., LTD., Tokyo (JP)

(72) Inventor: Koyo Nagoya, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 510 days.

(21) Appl. No.: 18/158,530

(22) Filed: Jan. 24, 2023

(65) Prior Publication Data

US 2023/0292073 A1 Sep. 14, 2023

(30) Foreign Application Priority Data

Mar. 9, 2022 (JP) ................................ 2022-036370

(51) Int. Cl.

*H04S 5/02* (2006.01)
*H04R 5/02* (2006.01)
*H04R 5/04* (2006.01)
*H04S 3/00* (2006.01)

(52) U.S. Cl.

CPC ................ *H04S 5/02* (2013.01); *H04R 5/02* (2013.01); *H04R 5/04* (2013.01); *H04S 3/008* (2013.01)

(58) Field of Classification Search

CPC . H04S 5/02; H04S 3/008; H04S 3/002; H04R 5/02; H04R 5/04; H04R 2203/12; H04R 9/06; H04R 3/00; H04R 9/02; H04R 2420/03; G10H 1/0033; G10H 1/047; G10H 2210/301

USPC .......................................... 381/18, 100, 300

See application file for complete search history.

(56) References Cited

U.S. PATENT DOCUMENTS 3,952,157 A * 4/1976 Takahashi .............. H04H 20/89 381/22
4,352,953 A 10/1982 Emmer
4,382,157 A * 5/1983 Wert, Jr. .................. H04S 3/00 381/186

(Continued)

FOREIGN PATENT DOCUMENTS

JP H06289859 A 10/1994
WO WO-0141504 A1 * 6/2001 ............... H04S 3/02

OTHER PUBLICATIONS

Extended European Search Report (EESR) dated Jul. 18, 2023, issued in counterpart European Application No. 23156981.5.

(Continued)

*Primary Examiner* — Duc Nguyen
*Assistant Examiner* — Chimezie Ezeriwe Bekee
(74) *Attorney, Agent, or Firm* — Holtz, Holtz & Volek PC

(57) ABSTRACT

A sound output device includes a processor, the processor being configured to generate a first output signal for sound to be output from a first output device by mixing a left-channel signal and a right-channel signal based on a first ratio, generate a second output signal for sound to be output from a second output device by mixing the left-channel signal and the right-channel signal based on a second ratio, generate a third output signal for sound to be output from a third output device by mixing the left-channel signal and the right-channel signal based on a third ratio, and generate a fourth output signal for sound to be output from a fourth output device by mixing the left-channel signal and the right-channel signal based on a fourth ratio.

20 Claims, 9 Drawing Sheets

LRX_INSIDE

(56) References Cited

U.S. PATENT DOCUMENTS

| | | | | |
|---|---|---|---|---|
| 4,622,689 | A * | 11/1986 | Hobrough | H04S 3/00 381/26 |
| 5,333,200 | A | 7/1994 | Cooper et al. | |
| 2003/0219137 | A1 * | 11/2003 | Fincham | H04R 5/02 381/86 |
| 2006/0078132 | A1 | 4/2006 | Sako et al. | |
| 2016/0286329 | A1 | 9/2016 | Grosche et al. | |
| 2019/0191260 | A1 * | 6/2019 | Mariglio | H03G 9/005 |

OTHER PUBLICATIONS

Japanese Office Action (and an English language translation thereof) dated Feb. 20, 2024, issued in counterpart Japanese Application No. 2022-036370.
European Office Action dated May 14, 2025, issued in counterpart European Application No. 23156981.5.

* cited by examiner

SOUND OUTPUT DEVICE, SOUND OUTPUT METHOD, AND STORAGE MEDIUM

CROSS-REFERENCE TO RELATED APPLICATIONS

This application is based upon and claims the benefit of priority from the Japanese Patent Application No. 2022-36370, filed Mar. 9, 2022, the entire contents of which are incorporated herein by reference.

FIELD

The present invention relates generally to a sound output device, a sound output method, and a storage medium.

BACKGROUND

Sound outputting devices using loudspeakers and amplifiers have been widely known, such as home audio systems, car audio systems, electronic musical instruments, and public address (PA) systems. Among these, monophonic systems are now less common, while systems that deal with stereo signals for the left (L) channel and right (R) channels are commonly used.

For instance, as disclosed in Jpn. Pat. Appln. KOKAI Publication No. H6-289859, a sound output device for stereo signals equipped with two speakers on each of the left side and right side is available, in which the speakers are individually driven by different amplifiers. By independently adjusting the volumes of the four loudspeakers, the device can freely control the sound pressure and acoustic side-to-side expansion.

SUMMARY

One of the advantages in the invention is that a sound output device comprising a processor, the processor being configured to generate a first output signal for sound to be output from a first output device by mixing a left-channel signal and a right-channel signal based on a first ratio, generate a second output signal for sound to be output from a second output device by mixing the left-channel signal and the right-channel signal based on a second ratio, generate a third output signal for sound to be output from a third output device by mixing the left-channel signal and the right-channel signal based on a third ratio, and generate a fourth output signal for sound to be output from a fourth output device by mixing the left-channel signal and the right-channel signal based on a fourth ratio.

DETAILED DESCRIPTION

Embodiments

An embodiment of the present invention will be described below.

Configuration

Figure 1:
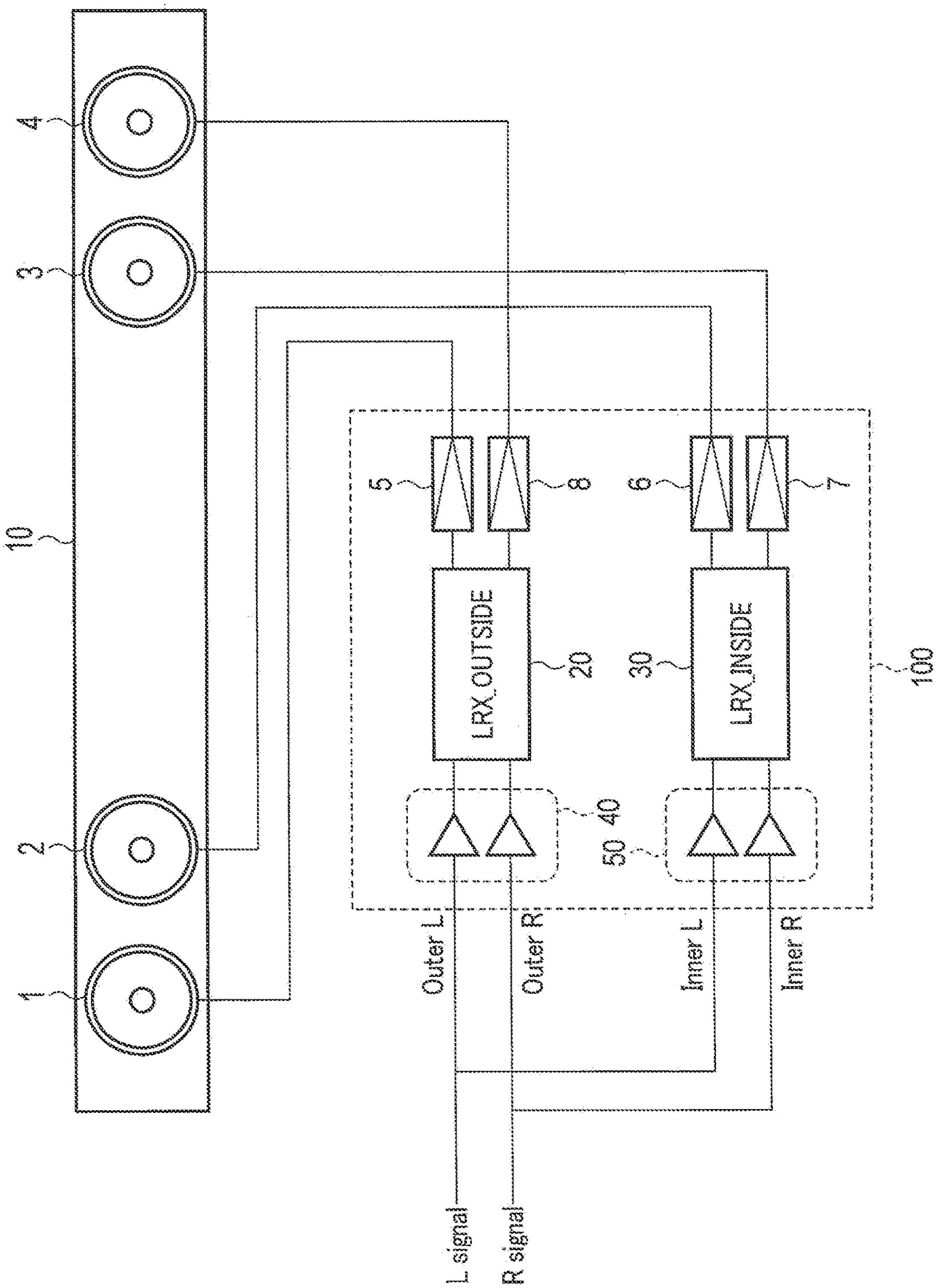
FIG. 1 is a block diagram illustrating an example of a speaker system according to the present embodiment.

FIG. 1 is a block diagram of an exemplary sound output device according to the embodiment. The sound output device includes speakers 1, 2, 3, and 4 mounted on a flat panel 10, and an output signal generator (output signal generating circuit) 100 for generating output signals for the respective speakers 1 to 4. That is, the sound output device is configured to acoustically output sound in accordance with the output signals generated based on 2-channel audio signals, namely L-channel signals (L signals) and R-channel signals (R signals), from four speakers.

According to the present embodiment, the speakers 1 and 2 are placed on the left side as viewed from the position of the listener to the sound output in response to the output signals, and the speakers 3 and 4 are placed on the right side. The listener who is listening to the sound may be positioned approximately between the speaker 2 and speaker 3. The speakers 1 and 4 are placed outside from the position of the listener, while the speakers 2 and 3 are placed inside. In other words, from the position of the listener, the speaker 1, speaker 2, speaker 3 and speaker 4 are placed in this order from left to right. The speaker 1 is an example of the first output device, the speaker 2 is an example of the second output device, the speaker 3 is an example of the third output device, and the speaker 4 is an example of the fourth output device. The speakers 1 to 4 are driven by power amplifiers 5 to 8, respectively, to output the sound.

In FIG. 1, the L signal is split into an outer L signal and an inner L signal, which are input to the output signal generator 100. Similarly, the R signal is split into an outer R signal and an inner R signal, which are input to the output signal generator 100.

The outer L signal and outer R signal are respectively adjusted to a certain level by a pre-amplifier 40, and then are input to the outer balancing circuit 20 of the output signal generator 100. Similarly, the inner L signal and inner R signal are respectively adjusted to a certain level by a pre-amplifier 50, and then are input to the inner balancing circuit 30.

The outer balancing circuit 20 generates output signals for the outer speakers 1 and 4 from the adjusted outer L signal and outer R signal. The output signals are respectively input to the power amplifiers 5 and 8, which respectively drive the speakers 1 and 4 to output a part of the sound.

The inner balancing circuit 30 generates output signals for the inner speakers 2 and 3 from the adjusted inner L signal and inner R signal. The output signals are respectively input to the power amplifiers 6 and 7, which respectively drive the speakers 2 and 3 to output a part of the sound.

Figure 2:
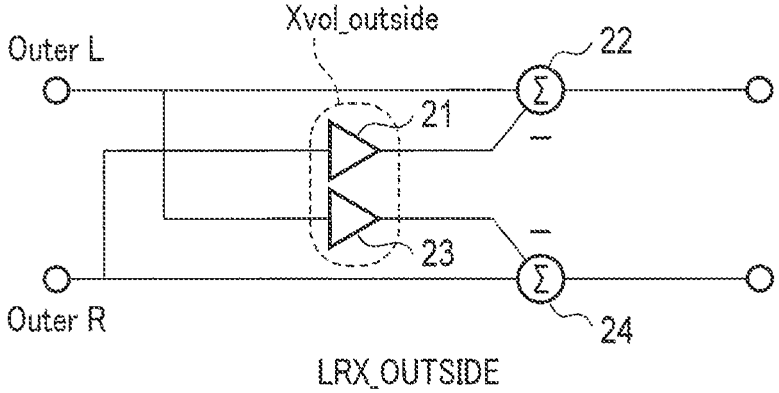
FIG. 2 is a diagram illustrating an example of an outer balancing circuit 20.

FIG. 2 is a diagram illustrating an example of an outer balancing circuit 20. The outer balancing circuit 20 includes inverting amplifiers 21 and 23 (Xvol_outside) and adders 22 and 24. The inverting amplifiers 21 and 23 respectively perform an inverting amplification on an input signal to a desired level and send the signal to the adders 22 and 24. Thus, signals of mutually opposite phases are input to the adders 22 and 24, as a result which the adders 22 and 24 serve as subtractors.

Figure 3:
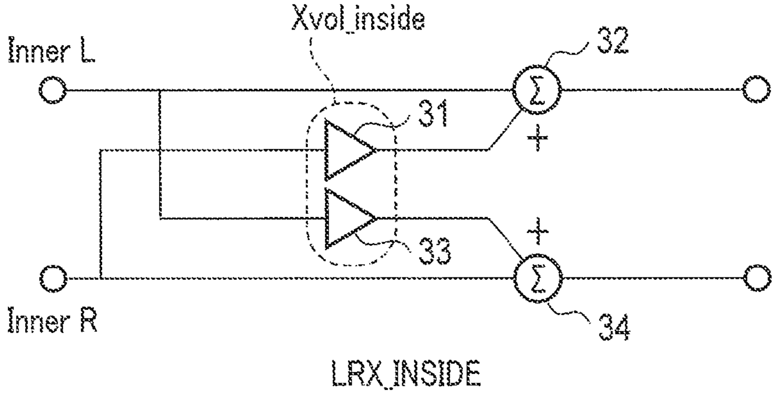
FIG. 3 is a diagram illustrating an example of an inner balancing circuit 30.

FIG. 3 is a diagram illustrating an example of an inner balancing circuit 30. The inner balancing circuit 30 includes in-phase amplifiers 31 and 33 (Xvol_inside), and adders 32 and 34. The in-phase amplifiers 31 and 33 perform a positive-phase amplification on the input signal to a desired level and send the signal to the adders 32 and 34. Thus, in-phase signals are input to the adders 32 and 34, as a result of which the adders 32 and 34 serve as adders.

In FIG. 2, the outer R signal is amplified by the inverting amplifier 21, and is mixed by the adder 22 with the outer L signal, which has an opposite phase. As a result, the first output signal is generated for the speaker 1. By setting the gain of the inverting amplifier 21 to any desired value, the outer L signal and the outer R signal can be added (mixed) together based on the first ratio to obtain the first output signal. That is, the inverting amplifier 21 and adder 22 serve as a first ratio setting block for setting the first ratio.

In FIG. 3, the inner R signal is adjusted by an in-phase amplifier 31, and is mixed by the adder 32 with the inner L signal, which is in phase with the inner R signal. As a result, the second output signal is generated for the speaker 2. By setting the gain of the in-phase amplifier 31 to any desired value, the inner L signal and the inner R signal can be added (mixed) together based on the second ratio to obtain the second output signal. That is, the in-phase amplifier 31 and adder 32 serve as a second ratio setting block for setting the second ratio.

In FIG. 3, the inner L signal is adjusted by an in-phase amplifier 33, and is mixed by the adder 34 with the inner R signal, which is in phase with the inner L signal. As a result, the third output signal is generated for the speaker 3. By setting the gain of the in-phase amplifier 33 to any desired value, the inner L signal and the inner R signal can be added (mixed) together based on the third ratio to obtain the third output signal. That is, the in-phase amplifier 33 and adder 34 serve as a third ratio setting block for setting the third ratio.

The description returns to FIG. 2. In FIG. 2, the outer L signal is adjusted by the inverting amplifier 23, and is mixed by the adder 24 with the outer R signal, which has an opposite phase. As a result, the fourth output signal is generated for the speaker 4. By setting the gain of the inverting amplifier 23 to any desired value, the outer L signal and the outer R signal can be added (mixed) together based on the fourth ratio to obtain the fourth output signal. That is, the inverting amplifier 23 and adder 24 serve as a fourth ratio setting block for setting the fourth ratio.

Next, the advantageous effects produced by the above configuration will be described.

In the sound processing known as mid/side processing, signals of two channels, L and R, are processed by splitting them into middle components (Mid) and side components (Side). This processing is adopted in the present embodiment. If it is assumed that:

$$L=\text{Mid}+\text{Side}$$

$$R=\text{Mid}-\text{Side} \tag{1}$$

then Mid and Side can be expressed as follows:

$$\text{Mid}=(L+R)/2$$

$$\text{Side}=(L-R)/2 \tag{2}$$

Assuming that m represents the component adjustment parameter of the Mid component and s represents the component adjustment parameter of the Side component, L and R can be expressed as follows:

$$\begin{aligned} L &= m(L+R)/2 + s(L-R)/2 && (3)\\ &= (mL+mR+sL-SR)/2 \\ &= L(m+s)/2 + R(m-s)/2 \\ R &= m(L+R)/2 - s(L-R)/2 && (4)\\ &= (mL+mR-sL+sR)/2 \\ &= L(m-s)/2 + R(m+s)/2 \end{aligned}$$

In equations (3) and (4), under a condition of $m>s$, the parameters for multiplying R and L are positive numbers. This corresponds to FIG. 3, where the L signal and R signal are added to the original signals.

On the other hand, under a condition of $m<s$ in equations (3) and (4), the parameters for multiplying R and L are negative numbers. This corresponds to FIG. 2, where the L signal and R signal are subtracted from the original signals.

Under a condition of $m=s=1$, it holds that $L=L$, and $R=R$. Thus, the localization of the original sounds in two-channel stereo can be produced.

By further rearranging the equations (3) and (4), equations (5) and (6) are obtained.

$$L=(L+R(m-s)/(m+s))\times(m+s)/2 \tag{5}$$

$$R=(R+L(m-s)/(m+s))\times(m+s)/2 \tag{6}$$

In equations (5) and (6), $(m+s)/2$ represents the value of the gain of the signal. In the present embodiment, the power amplifiers 5 to 8 are provided to amplify the signals, and therefore the signal amplification or attenuation does not need to be performed here. In other words, $(m+s)/2=1$ can be established, and therefore it can be considered that $m+s=2$. Then, the equations (5) and (6) are further rearranged as follows:

$$L=L+R(m-s)/2 \tag{7}$$

$$R=R+L(m-s)/2 \tag{8}$$

The component $(m-s)/2$ in equations (7) and (8) respectively corresponds to the gain of Xvol_outside in FIG. 2 and the gain of Xvol_inside in FIG. 3. As mentioned above, the condition of $m>s$ corresponds to Xvol_inside in FIG. 3, while the case where $m<s$ corresponds to Xvol_outside in FIG. 2. According to the present embodiment, Xvol_outside is an inverting amplifier, whose gain is −(m−s)/2.

Here, in order to prevent the left/right sound localization from changing from the localization of the original stereo signals, the gains of the left and right amplifiers need to be equalized so as to maintain the left/right volume balance. In other words, the amplifier 21 and the amplifier 23 have the same gain, and the amplifier 31 and the amplifier 33 have the same gain. On the other hand, the gain of Xvol_inside may take a value different from that of the gain of Xvol_outside. That is, the inner signal and outer signal may take different values, m and s, respectively.

Figure 4:
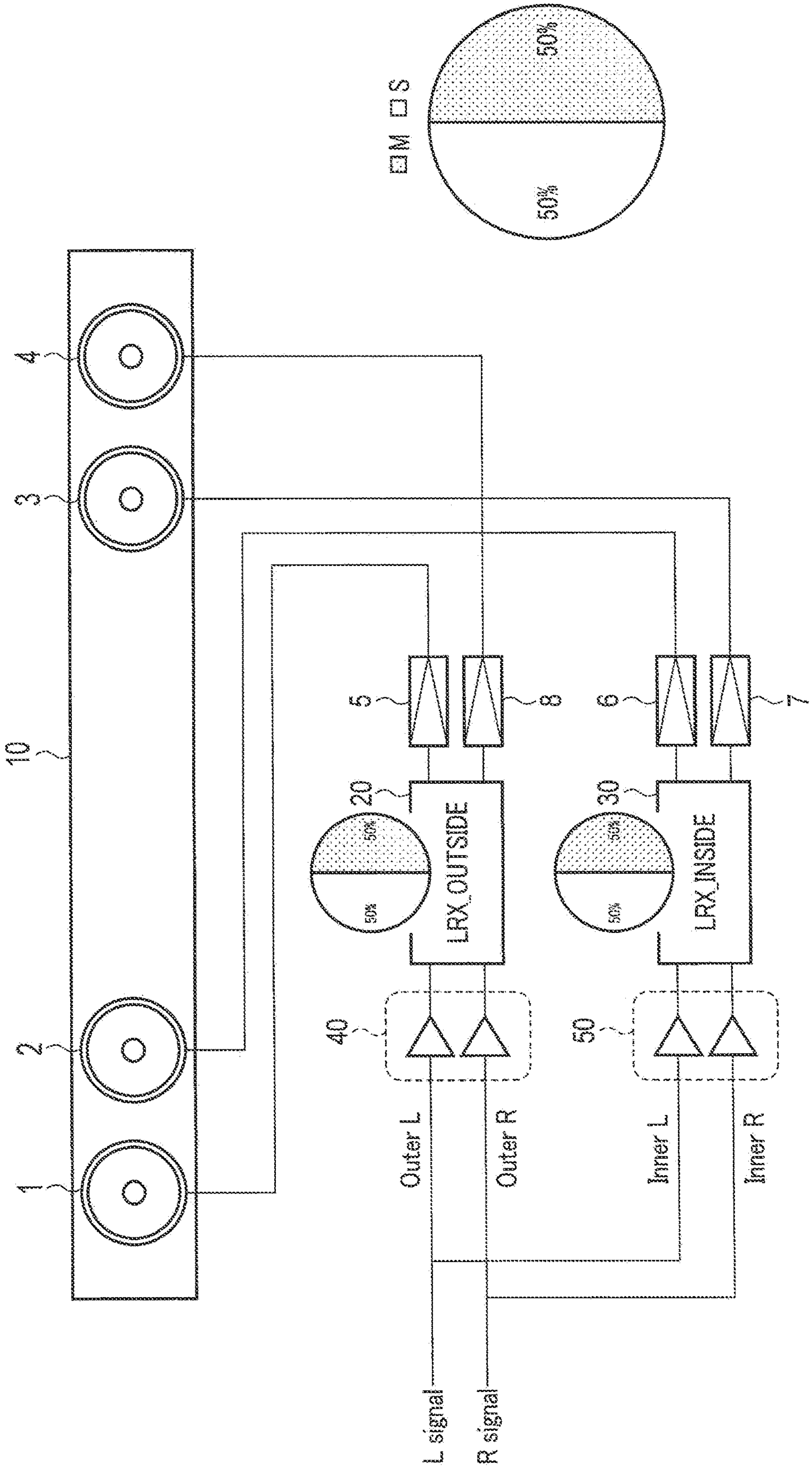
FIG. 4 is a diagram illustrating an example of sound setup.

FIG. 4 is a diagram illustrating an example of a sound setup. The setup of FIG. 4 realizes original 2-channel stereo localization. In the outer balancing circuit 20 and inner balancing circuit 30 of FIG. 4, parameters m and s are set to the same percentage.

Figure 5:
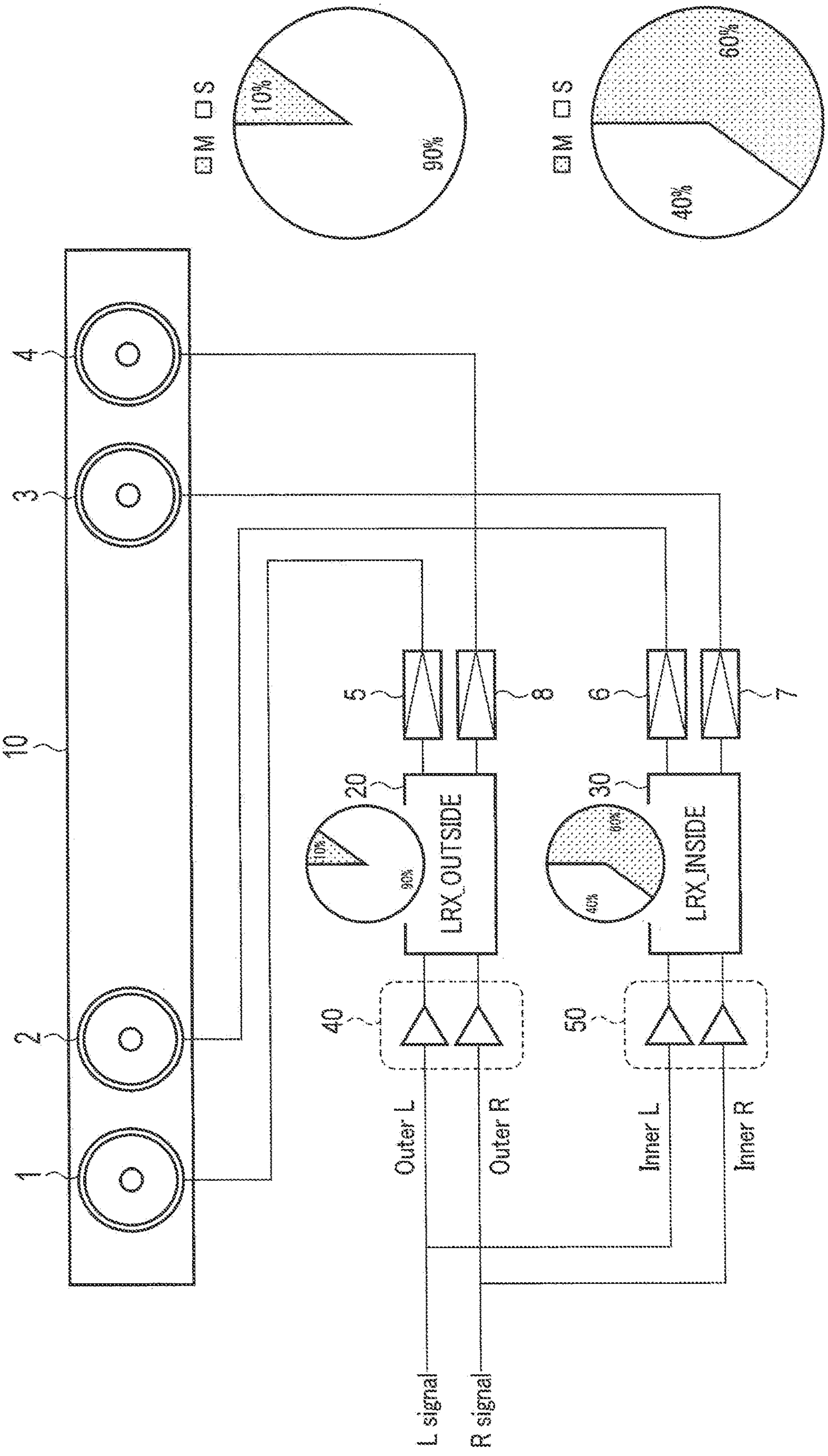
FIG. 5 is a diagram illustrating another example of sound setup.

FIG. 5 is a diagram illustrating another example of a sound setup. For instance, in order to enhance the sense of spaciousness of the reproduced sound from the outer speakers 1 and 4 by emphasizing the Side component while enhancing the cohesiveness of the reproduced sound from the inner speakers 2 and 3 by emphasizing the Mid component, m:s=10:90 may be set in the outer balancing circuit 20, and m:s=60:40 may be set in the inner balancing circuit 30.

In FIG. 5, in order to emphasize the sense of spaciousness of sound, a negative value may be set to the inverting amplifiers 21 and 23 (Xvol_outside) of the outer balancing circuit 20, and the L and R signals that have passed through the outer balancing circuit 20 are reproduced from the outer speakers 1 and 4. This corresponds to mutual offsetting of the L signal and R signal at a certain percentage. If the cohesiveness of the sound should be emphasized, a positive value is set to the in-phase amplifiers 31 and 33 (Xvol_inside) of the inner balancing circuit 30, and the L and R signals that have passed through the inner balancing circuit 30 are reproduced from the inner speakers 2 and 3. This corresponds to an addition of the L signal and R signal in a certain proportion.

That is, to enhance the left/right lateral sound width, the value s is increased and the value m is decreased (or unchanged) so as to enhance the Side component. In contrast, to enhance the sound cohesiveness toward the center, the value m is increased and the value s is decreased (or unchanged) to enhance the Mid component. It is possible to directly manipulate the value of Xvol, regardless of the values m and s, while checking the sound quality in consideration of the acoustic characteristics of the place where the sound output device is installed.

With m=2 and s=0, the monaural center localization (max Mid) can be realized. With m=0 and s=2, there is no L/R correlation (max Side), and therefore an L differential signal and an R differential signal can be obtained.

In equations (7) and (8), if a (where a is a positive number) represents (m−s)/2 corresponding to the gain of Xvol_inside and b (where b is a negative number) represents (m−s)/2 corresponding to the gain of the Xvol_outside, the output signal L1 for the speaker 1, the output signal L2 for the speaker 2, the output signal R3 for the speaker 3, and the output signal R4 for the speaker 4 are expressed by the following equations (9) to (12).

$$L1=L+bR \tag{9}$$

$$L2=L+aR \tag{10}$$

$$R3=R+aL \tag{11}$$

$$R4=R+bL \tag{12}$$

From equation (9), the proportion (first proportion) of the coefficients of the L signal and R signal in the outer signal L1 that are to be added together is 1:b. That is, the ratio of the coefficient of the R signal to that of the L signal is b (first ratio).

From equation (10), the proportion (second proportion) of the coefficients of the L signal and R signal in the inner signal L2 that are to be added together is 1:a. That is, the ratio of the coefficient of the R signal to that of the L signal is a (second ratio).

From equation (11), the proportion (third proportion) of the coefficients of the L signal and R signal in the inner signal R3 that are to be added together is a:1. That is, the ratio of the coefficient of the R signal to that of the L signal is 1/a (third ratio).

From equation (12), the proportion (fourth proportion) of the coefficients of the L signal and R signal in the outer signal R4 that are to be added together is b:1. That is, the ratio of the coefficient of the R signal to that of the L signal is 1/b (fourth ratio).

As seen from the above, the first ratio representing the ratio of the coefficient of the R signal to that of the L signal is reciprocal to the fourth ratio.

Further, the second ratio representing the ratio of the coefficient of the R signal to that of the L signal is reciprocal to the third ratio.

According to the present embodiment, (m+s)/2=1 is established. This means that −2≤m−s≤2, or in other words, −1≤(m−s)/2≤1. In the above description, a represents a positive number, and b is a negative number. However, a and b may each take a value between −1 and 1.

If a<0 is satisfied for the inner speakers 2 and 3, the inner signal becomes a differential signal, or in other words, it becomes a Side component. Similarly, if b>0 is satisfied, the outer signal becomes a Mid component. Such effects may be intentionally created.

In general, the first proportion corresponding to the first ratio and the second proportion corresponding to the second ratio are respectively one proportion in the range of 1:−1 to 1:1. The first proportion represents a proportion of the coefficient of the L signal to the coefficient of the R signal. The second proportion also represents a proportion of the coefficient of the L signal to the coefficient of the R signal.

Furthermore, the third proportion, which corresponds to the third ratio, and the fourth proportion, which corresponds to the fourth ratio, are respectively one proportion in the range of 1:−1 to 1:1. The third proportion represents a proportion of the coefficient of the L signal to the coefficient of the R signal. The fourth proportion represents a proportion of the coefficient of the L signal to the coefficient of the R signal.

In order to obtain the effect of controlling the spread of sound, it is preferable that a and b should be controlled to satisfy 0≤a≤1 and −1≤b≤0. That is, the inner signal is controlled to satisfy m s, while the outer signal is controlled to satisfy m≤s, where m+s=2.

In general, a proportion does not include a component 0. According to the present embodiment, however, a proportion may allow for 1:0 and 0:1. This corresponds to the case of a=0 or b=0, which indicates that the L signal and R signal are output as-is.

Figure 6:
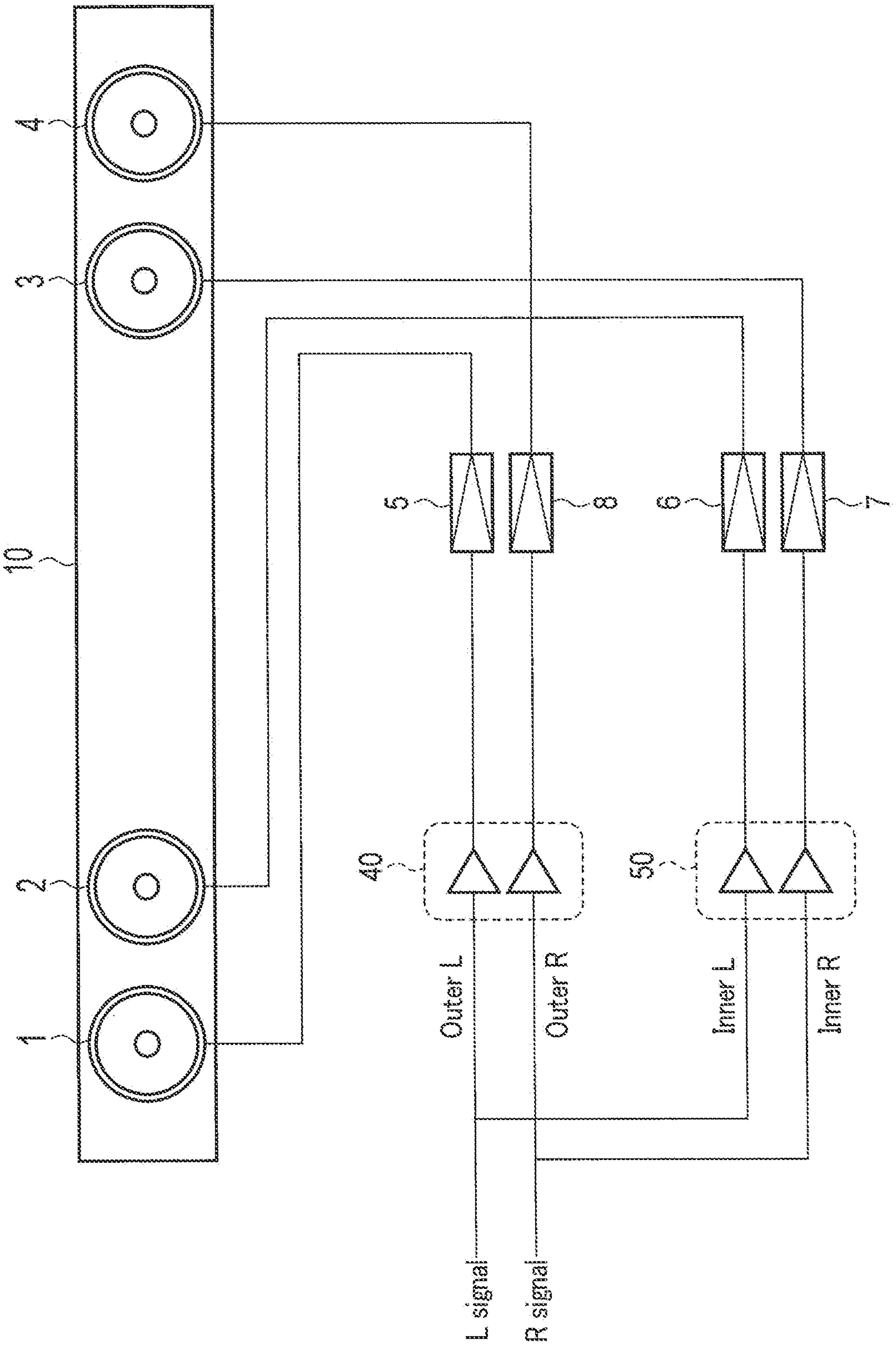
FIG. 6 is a block diagram illustrating a comparative example of a conventional speaker system.

FIG. 6 is a block diagram illustrating a comparative example of a conventional speaker system. In this system, the parameters m and s cannot be independently set, nor can they be variably set.

In contrast, according to the present embodiment, the parameters m and s can be adjusted so that the sound with a broader sense of spaciousness can be realized in comparison to sound easily reproduced by the same two-channel stereo signals. Moreover, phase interference can be mitigated.

Modification Examples

The modification examples of the present embodiment will be described below.

Figure 7:
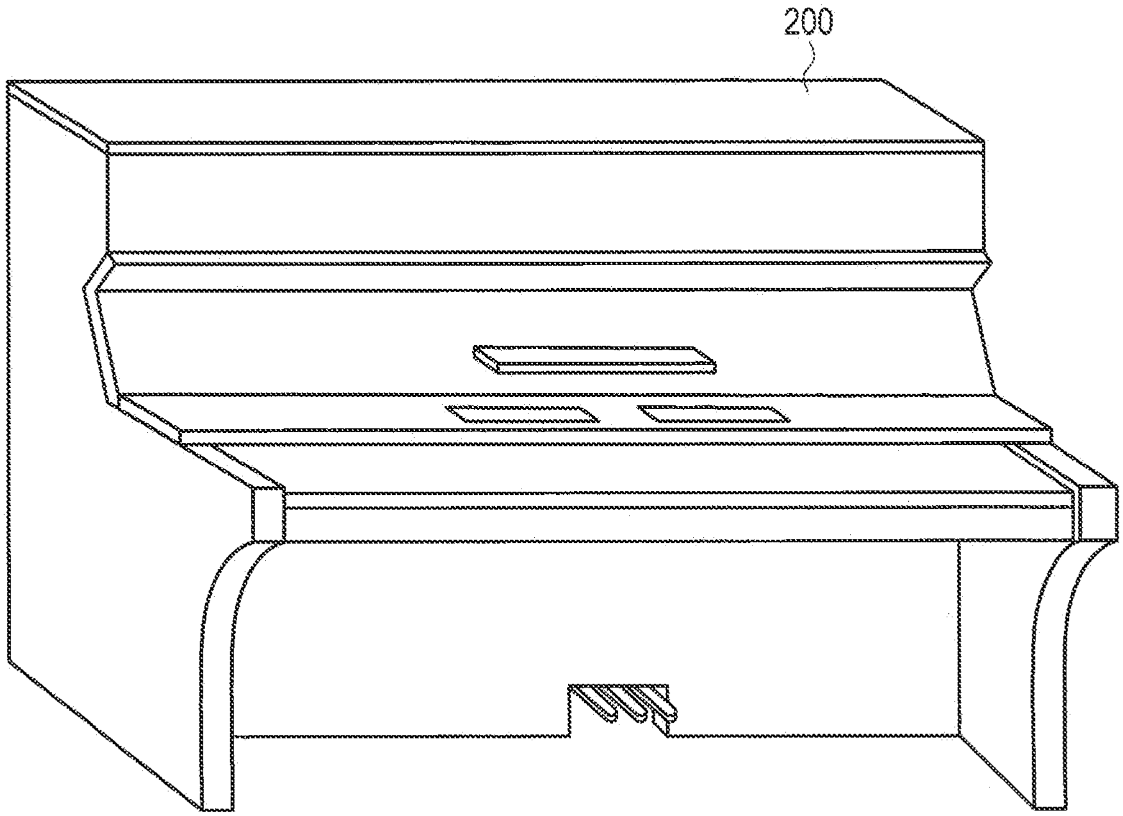
FIG. 7 is an external view of an exemplary electronic musical instrument provided with a sound output device.

FIG. 7 is an external view of an exemplary electronic musical instrument 200 provided with a sound output device. The electronic musical instrument 200 may be a digital piano having a keyboard and speakers for reproducing and outputting electronically generated sound. The electronic musical instrument 200 may be a computer in which a processor and a storage are incorporated.

Figure 8A:
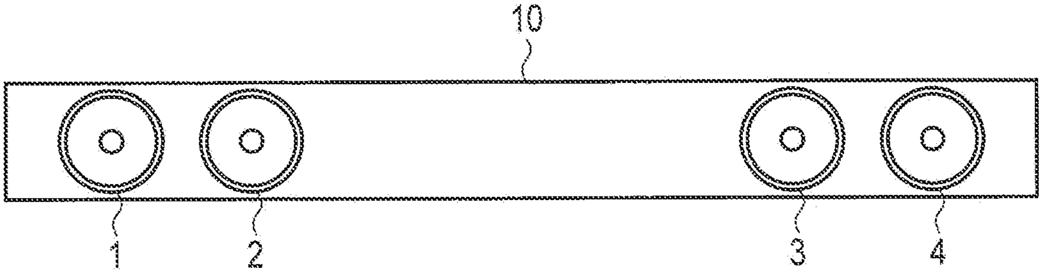
FIG. 8A is a diagram illustrating an exemplary arrangement of speakers in the electronic musical instrument.

FIG. 8A is a diagram illustrating an exemplary arrangement of speakers in an electronic musical instrument 200. The back view of the electronic musical instrument 200 as viewed from its back surface is depicted in FIG. 8A, with speakers 1 to 4 mounted on a back panel. As illustrated in this drawing, a pair of speakers may be closely arranged on the left and on the right laterally along the direction of keys of the keyboard.

Figure 8B:
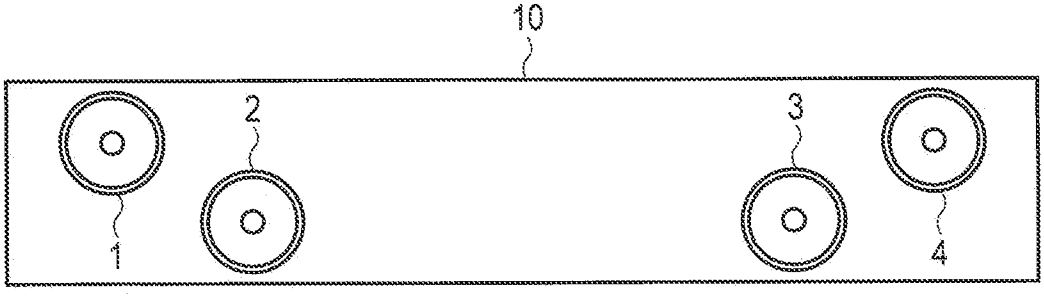
FIG. 8B is a diagram illustrating another exemplary arrangement of speakers in the electronic musical instrument.
Figure 8C:
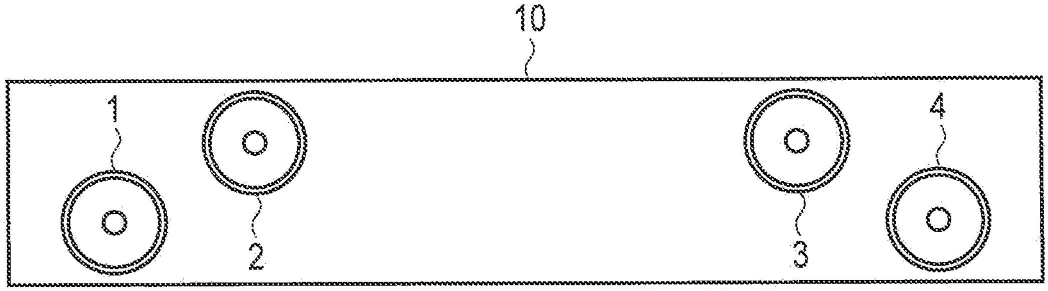
FIG. 8C is a diagram illustrating another exemplary arrangement of speakers in the electronic musical instrument.

In FIG. 8B, the speakers 1 to 4 are arranged on the upper panel. In most structures, the upper panel provides a larger area than the back panel. As depicted in FIG. 8B, the outer speakers 1 and 4 may be arranged farther away from the listener (player), while the inner speakers 2 and 3 may be displaced so as to be closer to the listener. Alternatively, as depicted in FIG. 8C, the outer speakers 1 and 4 may be arranged closer to the listener, while the inner speakers 2 and 3 may be displaced so as to be farther away from the listener.

Figure 9A:
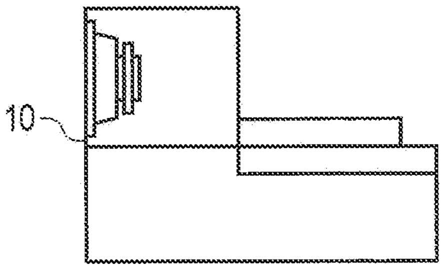
FIG. 9A is a diagram illustrating another exemplary arrangement of speakers in the electronic musical instrument.
Figure 9B:
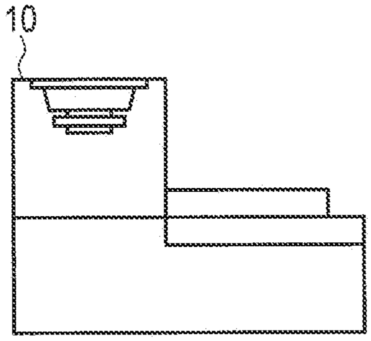
FIG. 9B is a diagram illustrating another exemplary arrangement of speakers in the electronic musical instrument.

FIG. 9A is a diagram illustrating another exemplary arrangement of speakers in the electronic musical instrument 200. The cross section of the electronic musical instrument 200 as viewed from its lateral side is depicted in FIG. 9A. In FIG. 9A, the arrangement of FIG. 8A is indicated, while in FIG. 9B, the arrangement of FIG. 8B is indicated.

Figure 9C:
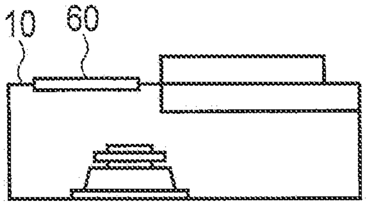
FIG. 9C is a diagram illustrating another exemplary arrangement of speakers in the electronic musical instrument.
Figure 9D:
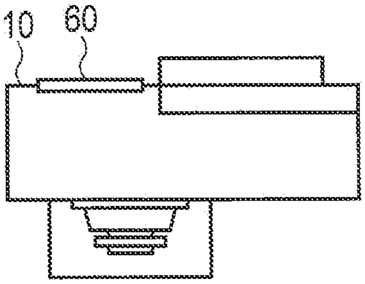
FIG. 9D is a diagram illustrating another exemplary arrangement of speakers in the electronic musical instrument.

The structures depicted in FIGS. 9C and 9D include a sound hole 60 in the panel 10 so as to create bass reflex effects. As shown in FIG. 9C, the speakers may be arranged by providing an opening that faces outwardly with respect to the digital piano body. Alternatively, as shown in FIG. 9D, the speakers may be arranged by providing an opening that faces inwardly with respect to the digital piano body so that the reproduced sound will be audible through the sound hole 60.

As described above, according to the present embodiment, signals of desired levels are generated for two inner channels and two outer channels from a 2-channel L/R stereo input signal. And from these generated signals, a differential signal or a sum signal of a desired level is generated by the output signal generator 100. In other words, the sound output device reproduces the sound generated in accordance with an L stereo signal and an R stereo signal are respectively split to the left and right signals, through four speakers including a pair of speakers closely arranged on the left and a pair of speakers closely arranged on the right. More specifically, the sound output device outputs sound based on an L signal with the Side component adjusted according to a signal component which a signal obtained by multiplying the R signal by arbitrary percentage is subtracted from the L signal, through the outer speaker 1. Furthermore, the sound output device outputs sound based on an R signal with the Side component adjusted according to a signal component which a signal obtained by multiplying the L signal by arbitrary percentage is subtracted from the R signal, through the outer speaker 4. Furthermore, the sound output device outputs sound based on n L signal with the Mid component adjusted according to a signal component which a signal obtained by multiplying the R signal by arbitrary percentage is added to the L signal, through the inner speaker 2. The sound output device outputs sound based on an R signal with the Mid component adjusted according to a signal component which a signal obtained by multiplying the L signal by arbitrary percentage is added to the R signal, through the inner speaker 3. In this manner, the spaciousness and cohesiveness of the stereo sound can be controlled, and the phase interference can be mitigated.

Moreover, according to the present embodiment, a Mid signal and a Side signal can be generated from the L signal and R signal so that Mid balance and Side balance can be adjusted on the inner side and on the outer side. In this manner, a sense of spaciousness and a sense of cohesiveness can be controlled. In particular, the acoustic effects can be enhanced by adjusting the Mid volume for the inner signal and the Side volume for the outer signal. Furthermore, according to the present embodiment, auditory comfortability such as a sense of spaciousness and a sense of cohesiveness can be freely controlled, and the phase interference can be mitigated.

In this manner, the present embodiment offers a sound output device, sound output method, and storage medium, which can enhance the degree of freedom for controlling the listening experience.

The present invention, however, is not limited to the above embodiment. For instance, in the configuration of FIG. 2, the adder 22 adds an inverted signal obtained by inverting the outer R signal to the outer L signal, and the adder 24 adds an inverted signal obtained by inverting the outer L signal to the outer R signal. In other words, the adder 22 substracts the outer R signal from the outer L signal, and the adder 24 substracts the outer L signal from the outer R signal. This is to generate a differential signal of the outer L signal and outer R signal. Furthermore, in the configuration of FIG. 3, the adder 32 adds the inner R signal to the inner L signal, and the adder 34 adds the inner L signal to the inner R signal. This is to generate a sum signal of the inner L signal and inner R signal. It should be noted, however, that the subtraction is not limited to the outer signals, and the addition is not limited to the inner signals. The subtraction of the outer signals and addition of the inner signals may be preferable to produce natural listening experience effects; however, for eccentric listening experience effects, the L signal and R signal may be submitted to the subtraction, or to the addition, on both the outer and inner sides.

The configurations of FIGS. 1 to 3 may be realized by software digital calculation processing.

Figure 10:
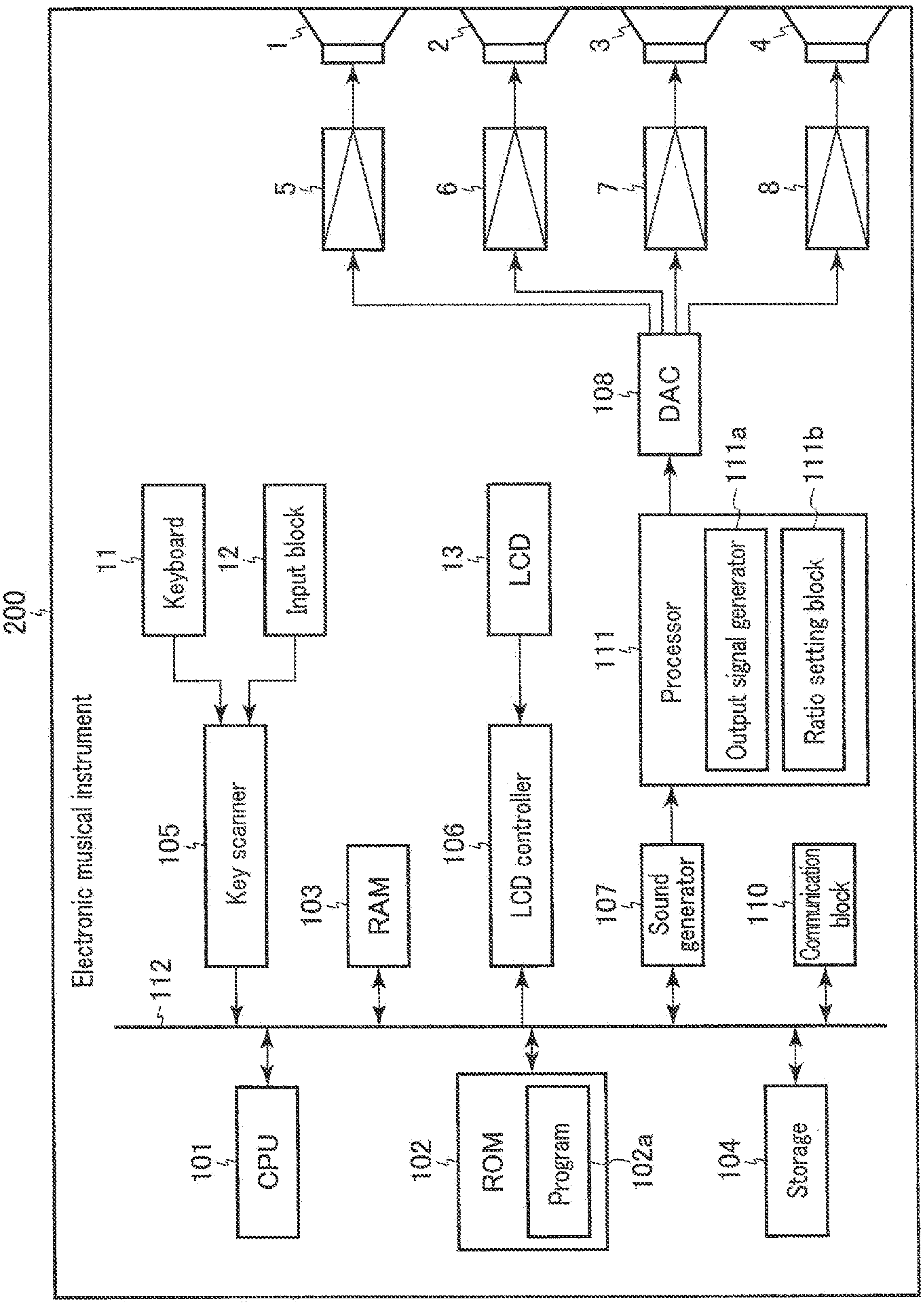
FIG. 10 is a functional block diagram of the exemplary electronic musical instrument illustrated in FIG. 7.

FIG. 10 is a functional block diagram of the exemplary electronic musical instrument 200 illustrated in FIG. 7. The electronic musical instrument 200 includes, in addition to the speakers 1 to 4 and power amplifiers 5 to 8, a keyboard 11, an input block 12, a liquid crystal display (LCD) 13, a central processing unit (CPU) 101, a read-only memory (ROM) 102, a random-access memory (RAM) 103, a storage 104, a key scanner 105, an LCD controller 106, a sound generator 107, a digital-to-analog converter (DAC) 108, a communication block 110, a processor 111, and a bus 112.

The CPU 101 controls the overall operation of the electronic musical instrument 200. The CPU 101 may expand (read out) a program 102*a* stored in the ROM 102 or storage

104 into the RAM 103. By executing the program expanded in the RAM 103, the CPU 101 realizes various functions of the electronic musical instrument 200.

The ROM 102 is a read-only storage specifically designed to store data in a nonvolatile manner. The ROM 102 may store a system control program for controlling the electronic musical instrument 200 and sound waveform data for generating musical tones.

The RAM 103 is a storage utilized as a work area of the CPU 101. For instance, the RAM 103 may store data necessary to execute a program stored in the ROM 102 or storage 104. The RAM 103 also temporarily stores data such as sound waveform data.

The storage 104 stores data in a nonvolatile and readable/rewritable manner. The storage 104 may store recorded data. The storage 104 may be externally coupled to the electronic musical instrument 200.

The key scanner 105 is an integrated circuit (IC) that can detect the manipulation state of a manipulation terminal. The key scanner 105 is coupled to the keyboard 11 and input block 12. The key scanner 105 constantly monitors the key strike/release state (operation state) of the keyboard 11, and the operation state of the input block 12. Then, the key scanner 105 informs the CPU 101 of the operation states of the keyboard 11 and the input block 12.

The LCD controller 106 is an IC coupled to the LCD 13 to control the display mode of the LCD 13. The LCD controller 106 displays various kinds of information on the LCD 13 under the control performed by the CPU 101. The LCD controller 106 is replaceable in accordance with the specifications of the display mounted on the electronic musical instrument 200.

The sound generator 107 may be a General MIDI (GM) sound generator in conformity with the GM standard. The sound generator 107 may have the ability to simultaneously produce up to 256 voices at maximum, allowing for the use of multiple tones. The sound generator 107 may read sound waveform data from the RAM 103 under the control of the CPU 101, and input the read-out sound waveform data into the processor 111. This sound waveform data includes two channels for L signals and R signals.

The processor 111 may be a digital signal processor (DSP) that is a computational device for processing the sound waveform data in a digital field. Based on the sound waveform data, the processor 111 generates a first output signal for the speaker 1, a second output signal for the speaker 2, a third output signal for the speaker 3, and a fourth output signal for the speaker 4, and inputs them to the DAC 108.

The DAC 108 performs digital-to-analog conversion on the first to fourth output signals and inputs the resultant signals respectively to the power amplifiers 5 to 8. The power amplifiers 5 to 8 amplify analog signals from the DAC 108, and drive the speakers 1 to 4 to output the sound.

The communication block 110 is used for a connection with a tablet computer or a smartphone. The communication block 110 includes a BLE-MIDI communication block. The communication block 110 informs the CPU 101 of a signal received from a terminal device, and outputs to the terminal device a signal output from the key scanner 105 and the like.

The bus 112 is a data transmission path used for communications among the components of the electronic musical instrument 200. To the bus 112, the CPU 101, ROM 102, RAM 103, storage 104, key scanner 105, LCD controller 106, sound generator 107, and communication block 110 are coupled. Various devices such as pedals used for playing may be coupled to the bus 112. With an external terminal coupled to the bus 112 in a wired or wireless manner, the electronic musical instrument 200 may be operated based on the manipulation of the external terminal.

As the functions relating to the present embodiment, the processor 111 includes an output signal generator 111*a* and a ratio setting block 111*b*.

The output signal generator 111*a* generates an outer L signal and an inner L signal from the L signal data of the sound waveform data received from the sound generator 107, and an outer R signal and an inner R signal from the R signal data.

Furthermore, the output signal generator 111*a* adds the outer L signal and outer R signal in accordance with the first ratio to generate the first output signal. The output signal generator 111*a* further adds the inner L signal and inner R signal in accordance with the second ratio to generate the second output signal. The output signal generator 111*a* further adds the inner L signal and inner R signal in accordance with the third ratio to generate the third output signal. Furthermore, the output signal generator 111*a* adds the outer L signal and outer R signal in accordance with the fourth ratio to generate the fourth output signal.

The ratio setting block 111*b* sets the first ratio, second ratio, third ratio, and fourth ratio.

The program 102*a* includes commands for causing the computer to function as the output signal generator 111*a*. In other words, the program 102*a* includes a command for causing the processor 111 to generate the first output signal by adding the outer L signal and outer R signal based on the first ratio, a command for causing it to generate the second output signal by adding the inner L signal and inner R signal based on the second ratio, a command for causing it to generate a third output signal by adding the inner L signal and inner R signal based on the third ratio, and a command for causing it to generate a fourth output signal by adding the outer L signal and outer R signal based on the fourth ratio.

The program 102*a* further includes a command for causing the computer to function as the ratio setting block 111*b*.

As described above, the sound output device according to the present embodiment may be realized by computational processing performed by a processor. This embodiment is compatible with a configuration in which an L signal and an R signal are provided as digital data.

Several embodiments of the present invention have been explained, merely as examples, and thus are not meant to restrict the scope of invention. Indeed, the embodiments may be embodied in various other forms; furthermore, various omissions, substitutions and changes may be made without departing from the spirit of the invention. The accompanying claims and their equivalents are intended to cover such forms or modifications as would fall within the scope and spirit of the invention.

What is claimed is:

1. A sound output device comprising:

an outer balancing circuit;

an inner balancing circuit; and a processor controlling the outer balancing circuit and the inner balancing circuit, the processor being configured to:

generate a first output signal for sound to be output from a first output device by mixing a left-channel signal and a right-channel signal based on a first ratio;

generate a second output signal for sound to be output from a second output device by mixing the left-channel signal and the right-channel signal based on a second ratio;

generate a third output signal for sound to be output from a third output device by mixing the left-channel signal and the right-channel signal based on a third ratio; and generate a fourth output signal for sound to be output from a fourth output device by mixing the left-channel signal and the right-channel signal based on a fourth ratio, wherein:

the first and fourth output devices are outer speakers and the second and third output devices are inner speakers in a linear speaker array, the first and fourth output devices are balanced by the outer balancing circuit, and the second and third output device are balanced by the inner balancing circuit, the processor independently and variably sets the first through fourth ratios in accordance with user-settable Mid (m) and Side (s) component parameter values that are input according to a user designation of a first m/s ratio for a pair of the first and fourth sound output devices constituting the outer speakers of the linear speaker array and a user designation of a second m/s ratio for a pair of the second and third sound output devices constituting the inner speakers of the linear speaker array, and that control relative contribution of Mid and Side signal components to the first through fourth output signals, where the Mid and Side signal components are derived from the left-channel signal and the right-channel signal, the first to fourth ratios are set in accordance with the designated m/s ratio for each pair such that left/right sound localization of the original left-channel signal and right-channel signal is maintained within the corresponding pair and such that Mid/Side balance for one pair is independently adjustable from Mid/Side balance of the other pair, the Mid signal component comprises the sum of the left-channel and right-channel signals, and the Side signal component comprises the difference of the left-channel and right-channel signals, and the first output signal L1, the second output signal L2, the third output signal R3, and the fourth output signal R4 output from the outer balancing circuit and the inner balancing circuit are expressed by the following formulas:

$$L1=L+(m\ \text{out}-s\ \text{out})/2*R$$

$$L2=L+(m\ \text{in}-s\ \text{in})/2*R$$

$$R3=R+(m\ \text{in}-s\ \text{in})/2*L$$

$$R4=R+(m\ \text{out}-s\ \text{out})/2*L$$

where:

m out is a component adjustment parameter of the Mid component for the pair of the first and fourth output devices, and s out is a component adjustment parameter of the Side component for the pair of the first and fourth output devices, and m in is a component adjustment parameter of the Mid component for the pair of the second and third output devices, and s in is a component adjustment parameter of the Side component for the pair of the second and third output devices.

2. The sound output device according to claim 1, wherein the processor sets the first ratio, the second ratio, the third ratio, and the fourth ratio.

3. The sound output device according to claim 1, wherein the processor outputs:

the first output signal to the first output device;

the second output signal to the second output device;

the third output signal to the third output device; and the fourth output signal to the fourth output device.

4. The sound output device according to claim 1, wherein a first output position of the first output device outputting sound in accordance with the first output signal is on a left side with respect to a second output position of the second output device outputting sound in accordance with the second output signal, as viewed from a listener, and a third output position of the third output device outputting sound in accordance with the third output signal is on a left side with respect to a fourth output position of the fourth output device outputting sound in accordance with the fourth output signal, as viewed from the listener.

5. The sound output device according to claim 4, wherein the third output position is on a right side with respect to the second output position, as viewed from the listener.

6. The sound output device according to claim 1, wherein the first ratio and the fourth ratio establish a mutually reciprocal relationship.

7. The sound output device according to claim 1, wherein the second ratio and the third ratio establish a mutually reciprocal relationship.

8. The sound output device according to claim 1, wherein each of a first proportion corresponding to the first ratio and a second proportion corresponding to the second ratio is a proportion that falls within a range of 1:1 to 1:1, including 1:0, and each of a third proportion corresponding to the third ratio and a fourth proportion corresponding to the fourth ratio is a proportion that falls within a range of 1:1 to 1:1, including 0:1.

9. A sound output method implemented by a processor of a sound output device, the sound output device comprising an outer balancing circuit and an inner balancing circuit, the processor controlling the outer balancing circuit and the inner balancing circuit, and the method comprising:

generating a first output signal for sound to be output from a first output device by mixing a left-channel signal and a right-channel signal based on a first ratio;

generating a second output signal for sound to be output from a second output device by mixing the left-channel signal and the right-channel signal based on a second ratio;

generating a third output signal for sound to be output from a third output device by mixing the left-channel signal and the right-channel signal based on a third ratio; and generating a fourth output signal for sound to be output from a fourth output device by mixing the left-channel signal and the right-channel signal based on a fourth ratio, wherein:

the first and fourth output devices are outer speakers and the second and third output devices are inner speakers in a linear speaker array, the first and fourth output devices are balanced by the outer balancing circuit, and the second and third output device are balanced by the inner balancing circuit, the method comprises independently and variably setting the first through fourth ratios in accordance with user-settable Mid (m) and Side (s) component parameter values that are input according to a user designation of a first m/s ratio for a pair of the first and fourth sound output devices constituting the outer speakers of the linear speaker array and a user designation of a second m/s ratio for a pair of the second and third sound output devices constituting the inner speakers of the linear speaker array, and that control relative contribution of Mid and Side signal components to the first through fourth output signals, where the Mid and Side signal components are derived from the left-channel signal and the right-channel signal, the first to fourth ratios are set in accordance with the designated m/s ratio for each pair such that left/right sound localization of the original left-channel signal and right-channel signal is maintained within the corresponding pair and such that Mid/Side balance for one pair is independently adjustable from Mid/Side balance of the other pair, the Mid signal component comprises the sum of the left-channel and right-channel signals, and the Side signal component comprises the difference of the left-channel and right-channel signals, and the first output signal L1, the second output signal L2, the third output signal R3, and the fourth output signal R4 output from the outer balancing circuit and the inner balancing circuit are expressed by the following formulas:

$$L1 = L + (m\ \text{out} - s\ \text{out})/2 * R$$

$$L2 = L + (m\ \text{in} - s\ \text{in})/2 * R$$

$$R3 = R + (m\ \text{in} - s\ \text{in})/2 * L$$

$$R4 = R + (m\ \text{out} - s\ \text{out})/2 * L$$

where:

m out is a component adjustment parameter of the Mid component for the pair of the first and fourth output devices, and s out is a component adjustment parameter of the Side component for the pair of the first and fourth output devices, and m in is a component adjustment parameter of the Mid component for the pair of the second and third output devices, and s in is a component adjustment parameter of the Side component for the pair of the second and third output devices.

10. The sound output method according to claim 9, wherein the processor sets the first ratio, the second ratio, the third ratio, and the fourth ratio.

11. The sound output method according to claim 9, wherein the processor outputs:

the first output signal to the first output device;

the second output signal to the second output device;

the third output signal to the third output device; and the fourth output signal to the fourth output device.

12. The sound output method according to claim 9, wherein a first output position of the first output device outputting sound in accordance with the first output signal is on a left side with respect to a second output position of the second output device outputting sound in accordance with the second output signal, as viewed from a listener, and a third output position of the third output device outputting sound in accordance with the third output signal is on a left side with respect to a fourth output position of the fourth output device outputting sound in accordance with the fourth output signal, as viewed from the listener.

13. The sound output method according to claim 12, wherein the third output position is on a right side with respect to the second output position, as viewed from the listener.

14. The sound output method according to claim 9, wherein the first ratio and the fourth ratio establish a mutually reciprocal relationship.

15. The sound output method according to claim 9, wherein the second ratio and the third ratio establish a mutually reciprocal relationship.

16. The sound output method according to claim 9, wherein each of a first proportion corresponding to the first ratio and a second proportion corresponding to the second ratio is a proportion that falls within a range of 1:1 to 1:1, including 1:0, and each of a third proportion corresponding to the third ratio and a fourth proportion corresponding to the fourth ratio is a proportion that falls within a range of 1:1 to 1:1, including 0:1.

17. A non-transitory computer readable medium storing a program thereon, the program being executable by a processor of a sound output device, the sound output device comprising an outer balancing circuit and an inner balancing circuit, the processor controlling the outer balancing circuit and the inner balancing circuit, and the program being executable by the processor to control the processor to:

generate a first output signal for sound to be output from a first output device by mixing a left-channel signal and a right-channel signal based on a first ratio;

generate a second output signal for sound to be output from a second output device by mixing the left-channel signal and the right-channel signal based on a second ratio;

generate a third output signal for sound to be output from a third output device by mixing the left-channel signal and the right-channel signal based on a third ratio; and generate a fourth output signal for sound from a fourth output device by mixing the left-channel signal and the right-channel signal based on a fourth ratio, wherein:

the first and fourth output devices are outer speakers and the second and third output devices are inner speakers in a linear speaker array, the first and fourth output devices are balanced by the outer balancing circuit, and the second and third output device are balanced by the inner balancing circuit, the program causes the processor to independently and variably set the first through fourth ratios in accordance with user-settable Mid (m) and Side (s) component parameter values that are input according to a user designation of a first m/s ratio for a pair of the first and fourth sound output devices constituting the outer speakers of the linear speaker array and a user designation of a second m/s ratio for a pair of the second and third sound output devices constituting the inner speakers of the linear speaker array, and that control relative contribution of Mid and Side signal components to the first through fourth output signals, where the Mid and Side signal components are derived from the left-channel signal and the right-channel signal, the first to fourth ratios are set in accordance with the designated m/s ratio for each pair such that left/right sound localization of the original left-channel signal and right-channel signal is maintained within the corresponding pair and such that Mid/Side balance for one pair is independently adjustable from Mid/Side balance of the other pair, the Mid signal component comprises the sum of the left-channel and right-channel signals, and the Side signal component comprises the difference of the left-channel and right-channel signals, and the first output signal L1, the second output signal L2, the third output signal R3, and the fourth output signal R4 output from the outer balancing circuit and the inner balancing circuit are expressed by the following formulas:

$$L1=L+(m\ \mathrm{out}-s\ \mathrm{out})/2*R$$

$$L2=L+(m\ \mathrm{in}-s\ \mathrm{in})/2*R$$

$$R3=R+(m\ \mathrm{in}-s\ \mathrm{in})/2*L$$

$$R4=R+(m\ \mathrm{out}-s\ \mathrm{out})/2*L$$

where:

m out is a component adjustment parameter of the Mid component for the pair of the first and fourth output devices, and s out is a component adjustment parameter of the Side component for the pair of the first and fourth output devices, and m in is a component adjustment parameter of the Mid component for the pair of the second and third output devices, and s in is a component adjustment parameter of the Side component for the pair of the second and third output devices.

18. The storage medium according to claim 17, wherein a first output position of the first output device outputting sound in accordance with the first output signal is on a left side with respect to a second output position of the second output device outputting sound in accordance with the second output signal, as viewed from a listener, a third output position of the third output device outputting sound in accordance with the third output signal is on a left side with respect to a fourth output position of the fourth output device outputting sound in accordance with the fourth output signal is output, as viewed from the listener, the third output position is on a right side with respect to the second output position, as viewed from the listener.

19. The storage medium according to claim 17, wherein the first ratio and the fourth ratio establish a mutually reciprocal relationship, and the second ratio and the third ratio establish a mutually reciprocal relationship.

20. The storage medium according to claim 17, wherein each of a first proportion corresponding to the first ratio and a second proportion corresponding to the second ratio is a proportion that falls within a range of 1:1 to 1:1, including 1:0, and each of a third proportion corresponding to the third ratio and a fourth proportion corresponding to the fourth ratio is a proportion that falls within a range of 1:1 to 1:1, including 0:1.

* * * * *